(12) United States Patent
Trachewsky

(10) Patent No.: US 8,938,032 B2
(45) Date of Patent: Jan. 20, 2015

(54) LOW-RATE LONG-RANGE MODE FOR OFDM WIRELESS LAN

(71) Applicant: Jason A. Trachewsky, Menlo Park, CA (US)

(72) Inventor: Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 40 days.

(21) Appl. No.: 13/745,994

(22) Filed: Jan. 21, 2013

(65) Prior Publication Data

US 2013/0136061 A1 May 30, 2013

Related U.S. Application Data

(63) Continuation of application No. 13/226,068, filed on Sep. 6, 2011, now Pat. No. 8,363,696, which is a continuation of application No. 12/796,315, filed on Jun. 8, 2010, now Pat. No. 8,014,437, which is a continuation of application No. 11/265,134, filed on Nov. 3, 2005, now Pat. No. 7,733,939.

(60) Provisional application No. 60/624,196, filed on Nov. 3, 2004.

(51) Int. Cl.
| | |
|---|---|
| H04L 27/06 | (2006.01) |
| H04B 1/707 | (2011.01) |
| H04J 13/00 | (2011.01) |
| H04K 1/00 | (2006.01) |
| H04L 5/02 | (2006.01) |
| H04L 5/06 | (2006.01) |
| H04W 88/04 | (2009.01) |
| H04L 27/26 | (2006.01) |
| H04W 4/18 | (2009.01) |
| H04W 84/12 | (2009.01) |

(52) U.S. Cl.
CPC ............... *H04B 1/707* (2013.01); *H04J 13/00* (2013.01); *H04K 1/00* (2013.01); *H04L 5/026* (2013.01); *H04L 5/06* (2013.01); *H04W 88/04* (2013.01); *H04L 27/2626* (2013.01); *H04L 27/2647* (2013.01); *H04W 4/18* (2013.01); *H04W 84/12* (2013.01)
USPC ........... 375/340; 375/131; 375/142; 375/143; 375/150; 375/152; 375/267; 375/347

(58) Field of Classification Search
USPC ......... 375/131, 142, 143, 150, 152, 267, 340, 375/347
See application file for complete search history.

(56) References Cited

U.S. PATENT DOCUMENTS 5,353,301 A * 10/1994 Mitzlaff ......................... 375/152
5,881,098 A * 3/1999 Tzou .............................. 375/152
(Continued)

*Primary Examiner* — Sophia Vlahos
(74) *Attorney, Agent, or Firm* — Garlick & Markison; Edward J. Marshall

(57) ABSTRACT

A system for implementing an orthogonal frequency division multiplexing scheme and providing an improved range extension. The system includes a transmitter for transmitting data to a receiver. The transmitter includes a symbol mapper for generating a symbol for each of a plurality of subcarriers and a spreading module for spreading out the symbol on each of the plurality of subcarriers by using a direct sequence spread spectrum. The symbol on each of the plurality of subcarriers is spread by multiplying the symbol by predefined length sequences. The receiver includes a de-spreader module for de-spreading the symbols on each of the plurality of subcarriers. The de-spreader module includes a simple correlator receiver for obtaining maximum detection. The correlator produces an output sequence of a same length as an input sequence and the de-spreader module uses a point of maximum correlation on the output sequence to obtain a recovered symbol.

20 Claims, 5 Drawing Sheets

According to one embodiment of the present invention, a transmitter appends copies of short training symbols between legacy signal and proprietary signal. The number of copies may equal, for example, the number of chips in a set.

(56) References Cited

U.S. PATENT DOCUMENTS

| | | | |
|---|---|---|---|
| 5,943,344 A * | 8/1999 | Keller et al. | 370/468 |
| 6,289,000 B1 * | 9/2001 | Yonge, III | 370/203 |
| 6,990,141 B1 * | 1/2006 | Iwasaki | 375/150 |
| 7,039,000 B2 * | 5/2006 | You et al. | 370/203 |
| 7,577,085 B1 * | 8/2009 | Narasimhan | 370/206 |
| 2001/0021182 A1 * | 9/2001 | Wakutsu | 370/344 |
| 2006/0008028 A1 * | 1/2006 | Maltsev et al. | 375/297 |

* cited by examiner

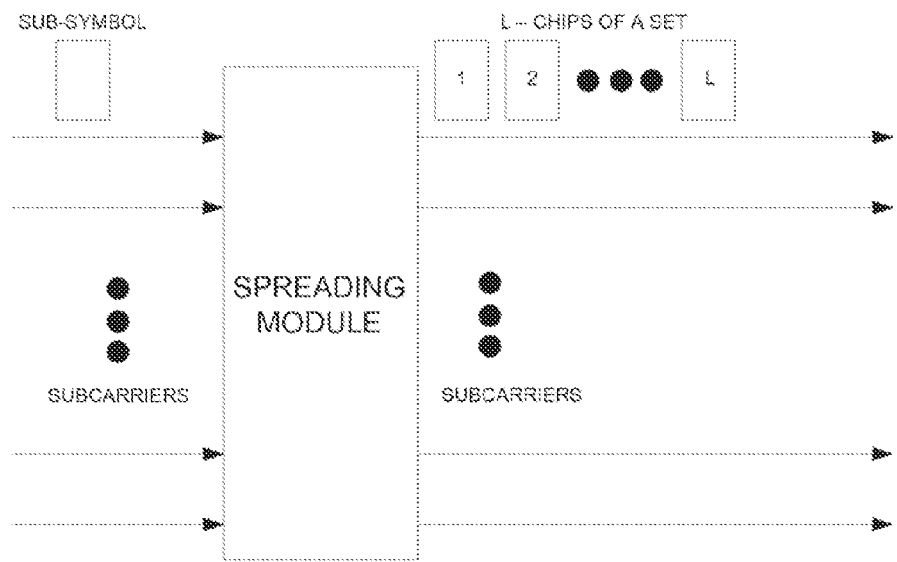
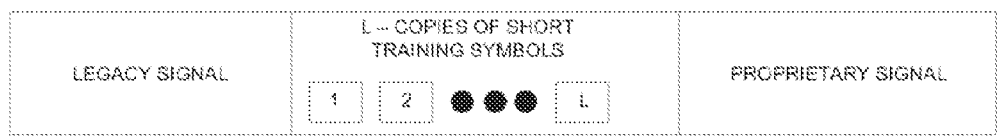
FIGURE 5

LOW-RATE LONG-RANGE MODE FOR OFDM WIRELESS LAN

CROSS-REFERENCE TO RELATED APPLICATIONS/INCORPORATION BY REFERENCE

This application is a continuation of U.S. patent application Ser. No. 13/226,068, entitled "LOW-RATE LONG-RANGE MODE FOR OFDM WIRELESS LAN," filed Sep. 6, 2011, now U.S. Pat. No. 8,363,696;

which is a continuation of U.S. patent application Ser. No. 12/796,315, entitled "LOW-RATE LONG-RANGE MODE FOR OFDM WIRELESS LAN," filed Jun. 8, 2010, now U.S. Pat. No. 8,014,437;

which is a continuation of U.S. patent application Ser. No. 11/265,134, entitled "LOW-RATE LONG-RANGE MODE FOR OFDM WIRELESS LAN," filed Nov. 3, 2005, now U.S. Pat. No. 7,733,939;

which makes reference to, claims priority to, and claims the benefit under 35 U.S.C. §119(e) of provisional application No. 60/624,196, filed on Nov. 3, 2004, now expired;

all of the above stated applications are incorporated herein by reference in their entireties and made part of the present U.S. Utility Patent Application for all purposes.

BACKGROUND OF THE INVENTION

1. Field of the Invention

The present invention relates generally to wireless communication systems and more particularly to an improvement in the range of a wireless LAN device.

2. Description of the Related Art

A wireless communication device in a communication system communicates directly or indirectly with other wireless communication devices. For direct/point-to-point communications, the participating wireless communication devices tune their receivers and transmitters to the same channel(s) and communicate over those channels. For indirect wireless communications, each wireless communication device communicates directly with an associated base station and/or access point via an assigned channel. To complete a communication connection between the wireless communication devices, the associated base stations and/or access points communicate with each other directly, via a system controller, the public switch telephone network, the Internet, and/or some other wide area network.

Each wireless communication device participating in wireless communications includes a built-in radio transceiver (i.e., receiver and transmitter) or is coupled to an associated radio transceiver. Typically, the transmitter includes one antenna for transmitting radiofrequency (RF) signals, which are received by one or more antennas of the receiver. When the receiver includes two or more antennas, the receiver selects one of antennas to receive the incoming RF signals. This type of wireless communication between the transmitter and receiver is known as a single-output-single-input (SISO) communication.

Different wireless devices in a wireless communication system may be compliant with different standards or different variations of the same standard. For example, 802.11a an extension of the 802.11 standard, provides up to 54 Mbps in the 5 GHz band and uses an orthogonal frequency division multiplexing (OFDM) encoding scheme. 802.11b, another extension of the 802.11 standard, provides 11 Mbps transmission (with a fallback to 5.5, 2 and 1 Mbps) in the 2.4 GHz band. 802.11g, another extension of the 802.11 standard, provides 20+Mbps in the 2.4 GHz band and also uses the OFDM encoding scheme. 802.11n, a new extension of 802.11, is being developed to address, among other things, higher throughput and compatibility issues. An 802.11a compliant communications device may reside in the same WLAN as a device that is compliant with another 802.11 standard. When devices that are compliant with multiple versions of the 802.11 standard are in the same WLAN, the devices that are compliant with older versions are considered to be legacy devices. To ensure backward compatibility with legacy devices, specific mechanisms must be employed to insure that the legacy devices know when a device that is compliant with a newer version of the standard is using a wireless channel to avoid a collision.

Currently, most SISO WLANs are IEEE 802.11 compliant. A current communications system provides a range extension on a SISO system by taking an 802.11a/802.11g signal and cutting the symbol rate. Specifically, the current communications system achieves range extension by dividing a symbol clock by 24, i.e., the inverse of Super-G, which doubles the clock frequency. When the symbol clock is divided, the maximum symbol duration is 96 μsec. and the corresponding rate is 250 kbps. For example, the current communications system takes an 802.11a/802.11g signal that is 16.5 MHz, divides the symbol clock by 24 and cuts the signal to 687.5 kHz. When the bandwidth for a signal is reduced, the integrated thermal noise density of the receiver is also reduced. Therefore, when the bandwidth is reduced by a factor of 24, the thermal noise floor is decreased by 10*log 10(24). This results in a 16 DB "gain" in the sensitivity of the receiver which is equivalent to at least 3 times improvement in the range of a typical wireless system. The cost of this implementation, however, is that the data rate is also decreased by a factor of 24. Furthermore, since legacy systems in the same cell as the current communications system may not detect this very narrow bandwidth, the current communications system does not interoperate with legacy 802.11a/802.11g systems in the same cell. Specifically, a legacy 802.11a/802.11g device may not detect overlapping Base Service Set (BSS) transmissions from the current system and as such the legacy 802.11a/802.11g system will not set its Clear Channel Assessment (CCA) bits appropriately. Therefore, in dense deployments, such as apartment buildings, network chaos is likely to occur when an active BSS in the current communications system overlaps with an active legacy BSS transmission.

SUMMARY OF THE INVENTION

According to one aspect of the invention, there is provided a network device implementing an orthogonal frequency division multiplexing scheme and providing an improved range extension. The network device includes receiving means for receiving data and a symbol mapper for generating a symbol for each of a plurality of subcarriers. The network device also includes a spreading module for spreading out the symbol on each of the plurality of subcarriers by using a direct sequence spread spectrum. The symbol on each of the plurality of subcarriers is spread by multiplying the symbol by predefined length sequences. The network device further includes transmitting means for transmitting the data to a receiver.

According to another aspect of the invention, there is provided a network device for receiving symbols on a plurality of subcarriers and proving improved range extension. The device includes receiving means for receiving the plurality of subcarriers. The device further includes a de-spreader module for de-spreading the symbols on each of the plurality of subcarriers. The de-spreader module includes a correlator receiver for obtaining maximum detection. The correlator produces an output sequence of a same length as an input sequence and the de-spreader module uses a point of maximum correlation on the output sequence to obtain a recovered symbol.

According to another aspect of the invention, there is provided a method implementing an orthogonal frequency division multiplexing scheme for transmitting data to a receiver and providing improved range extension. The method includes the steps of receiving data for processing and generating a symbol for each of a plurality of subcarriers. The method also includes the steps of spreading out the symbol on each of the plurality of subcarriers by using a direct sequence spread spectrum, wherein the symbol on each of the plurality of subcarriers is spread by multiplying the symbol by predefined length sequences; and transmitting the data to a receiver.

According to another aspect of the invention, there is provided a method for receiving symbols on a plurality of subcarriers and providing improved range extension. The method includes the steps of receiving the plurality of subcarriers and de-spreading the symbols on each of the plurality of subcarriers. The method also includes the steps of producing an output sequence of a same length as an input sequence and using a point of maximum correlation on the output sequence to obtain a recovered symbol.

According to another aspect of the invention, there is provided a system for implementing an orthogonal frequency division multiplexing scheme and providing an improved range extension. The system includes a transmitter for transmitting data to a receiver. The transmitter includes a symbol mapper for generating a symbol for each of a plurality of subcarriers and a spreading module for spreading out the symbol on each of the plurality of subcarriers by using a direct sequence spread spectrum. The symbol on each of the plurality of subcarriers is spread by multiplying the symbol by predefined length sequences. The receiver includes a de-spreader module for de-spreading the symbols on each of the plurality of subcarriers. The de-spreader module includes a simply correlator receiver for obtaining maximum detection. The correlator produces an output sequence of a same length as an input sequence and the de-spreader module uses a point of maximum correlation on the output sequence to obtain a recovered symbol.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 5 illustrates a spreading module of a transmitter that receives, for example, a sub-symbol and outputs L-chips of a set, and a frame that includes, for example, a legacy symbol, L-copies of short training symbols and a proprietary signal according to an embodiment of the present invention.

DETAILED DESCRIPTION OF THE INVENTION

Reference will now be made to the preferred embodiments of the present invention, examples of which are illustrated in the accompanying drawings.

Figure 1:
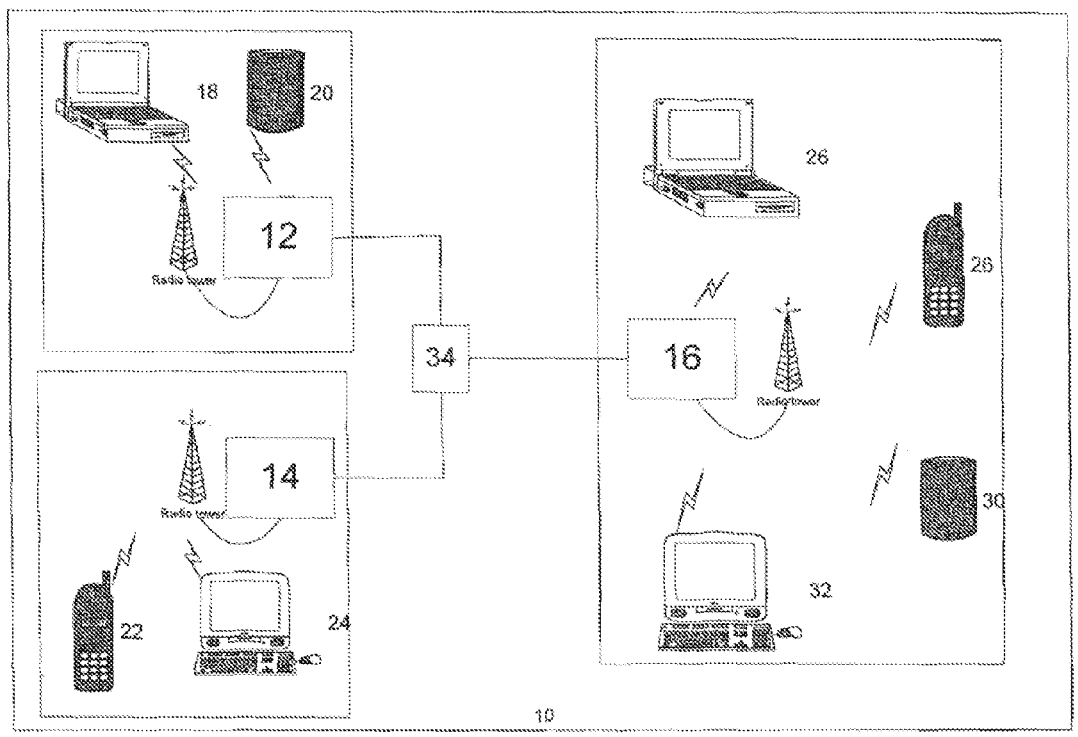
FIG. 1 illustrates a schematic block diagram illustrating a communication system.

FIG. 1 is a schematic block diagram illustrating a communication system 10 that includes a plurality of base stations and/or access points 12-16, a plurality of wireless communication devices 18-32 and a network hardware component 34. Wireless communication devices 18-32 may be laptop computers 18 and 26, personal digital assistant hosts 20 and 30, personal computer 24 and 32 and/or cellular telephone 22 and 28. Base stations or access points 12-16 are operably coupled to network hardware 34 via local area network connections 36, 38 and 40. Network hardware 34, for example a router, a switch, a bridge, a modem, or a system controller, provides a wide area network connection for communication system 10. Each of base stations or access points 12-16 has an associated antenna or antenna array to communicate with the wireless communication devices in its area. Typically, the wireless communication devices register with a particular base station or access point 12-14 to receive services from communication system 10. Each wireless communication device includes a built-in radio or is coupled to an associated radio. The radio includes at least one radio frequency (RF) transmitter and at least one RF receiver.

As is known to those skilled in the art, devices implementing both the 802.11a and 802.11g standards use an OFDM encoding scheme for transmitting large amounts of digital data over a radio wave. OFDM works by spreading a single data stream over a band of sub-carriers, each of which is transmitted in parallel. Specifically, the 802.11a/802.11g standards specify an OFDM physical layer (PHY) that splits an information signal across 52 separate sub-carriers to provide transmission of data at a rate of 6, 9, 12, 18, 24, 36, 48, or 54 Mbps. Four of the sub-carriers are pilot sub-carriers that the system uses as a reference to disregard frequency or phase shifts of the signal during transmission. The remaining 48 sub-carriers provide separate wireless pathways for sending the information in a parallel fashion. The 52 sub-carriers are modulated using binary or quadrature phase shift keying (BPSK/QPSK), 16 Quadrature Amplitude Modulation (QAM), or 64 QAM.

The present invention uses the OFDM encoding scheme and distributes data over sub-carriers that are spaced apart at precise frequencies. This spacing provides the "orthogonality" which prevents demodulators from seeing frequencies other than their own. The benefits of OFDM are high spectral efficiency, resiliency to RF interference, and lower multi-path distortion. The present invention reuses most of the data path and implements a more reliable lower rate by applying a Direct Sequence Spread Spectrum (DSSS) to each sub-carrier's stream of QAM sub-symbols. The assumption in OFDM is that each sub-carrier is a flat fading channel. Thus, the invention uses a simple matched filter receiver per sub-carrier at the receiver with insignificant loss.

Figure 2:
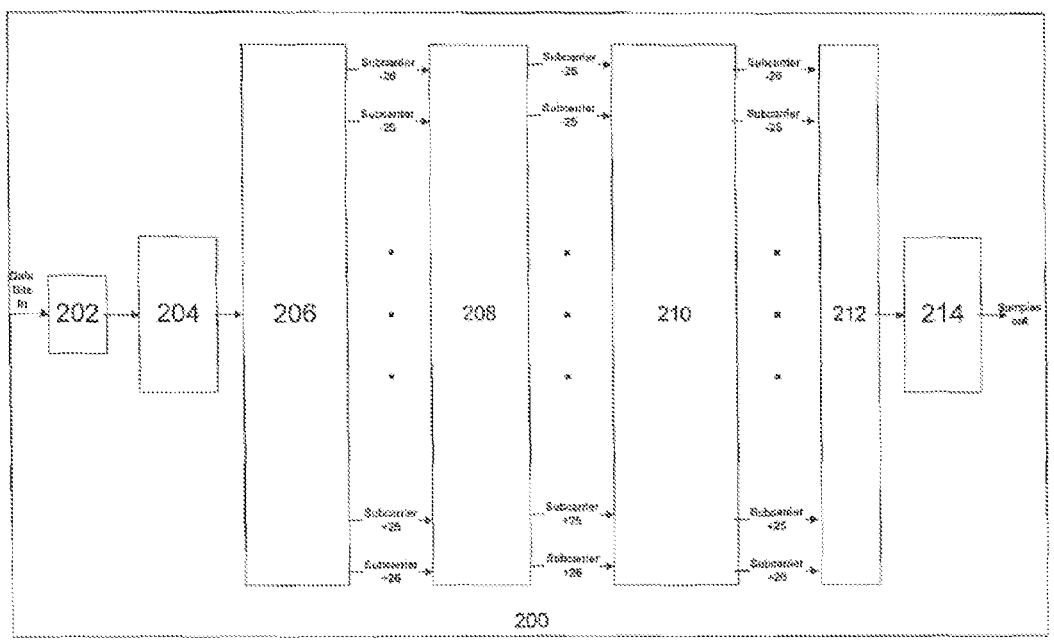
FIG. 2 illustrates a block diagram of a long-range transmitter used in the present invention.

FIG. 2 illustrates a block diagram of a long-range transmitter 200 used in the present invention. RF transmitter 200 includes a scrambler 202, a convolutional encoder and puncture module 204, a QAM symbol mapper 206, a spreading module 208, and Inverse Fast Fourier Transfer (IFFT) 210, a parallel to serial converter 212 and a cyclic prefix insertion module 214. All the bits in the data portion are scrambled by scrambler 202. Scrambling is used to randomize the data, which may contain long strings of binary data. The data field is then coded by convolutional encoder 204 with a coding rate of r=½. Symbol mapper 206 modulates the OFDM sub-carriers by using QAM modulation. Specifically, the data enters symbol mapper 206 which generates a QAM symbol for each OFDM sub-carrier.

The invention provides spreading gain improvement, wherein after the symbol are mapped to sub-carriers, spreading module 208 spreads out the symbol sequence on each of the parallel flat fading channels by using a direct sequence spread spectrum. Therefore, the symbols on each of the sub-carriers are spread out to the full sub-carrier width. According to the inventive system, each QAM sub-symbol is expanded into a set of L chips. Frank sequences may be used as the spreading code. According to one embodiment, the symbols are spread using a Constant Amplitude Zero Auto Correlation (CAZAC) sequence, wherein when a correlation is performed with itself, a non-zero component is present at only one point in time. The present invention spreads the symbols using length (L) CAZAC sequences, where L equals to 4, 16 or 64 sequences. As such, one symbol from symbol mapper 206 is multiplied by L sequences and when L=4, four symbols are produced by the spreading module 208, when L=16, 16 symbols are produced by the spreading module 208 and when L=64, 64 symbols are produced by spreading module 208.

A spreading sequence when L=16 and (i) is square root of −1 is presented by the equation:

$$C_{spread,16}=[1+i,-1-i,-1-i,-1-i,1+i,1-i,1+i,-1+i,1+i,1+i,-1-i,1+i,1+-i,1+i,-1+i,1+i,1-i]$$

When spreading module 208 applies the above spreading sequence, for each sub-carrier, spreading module 208 outputs a Length 16 sequence. IFFT 210 converts the sub-carriers from the frequency domain to the time domain. Parallel to serial converter 212 converts parallel time domain signals to a plurality of serial time signals. Cyclic prefix insertion module 214 introduces the cyclic prefix as a guard interval to each sub-channel. Therefore, orthogonality can be maintained while bandwidth efficiency is maintained. Transmitter 200 then transmits the OFDM symbols to a receiver.

Figure 3:
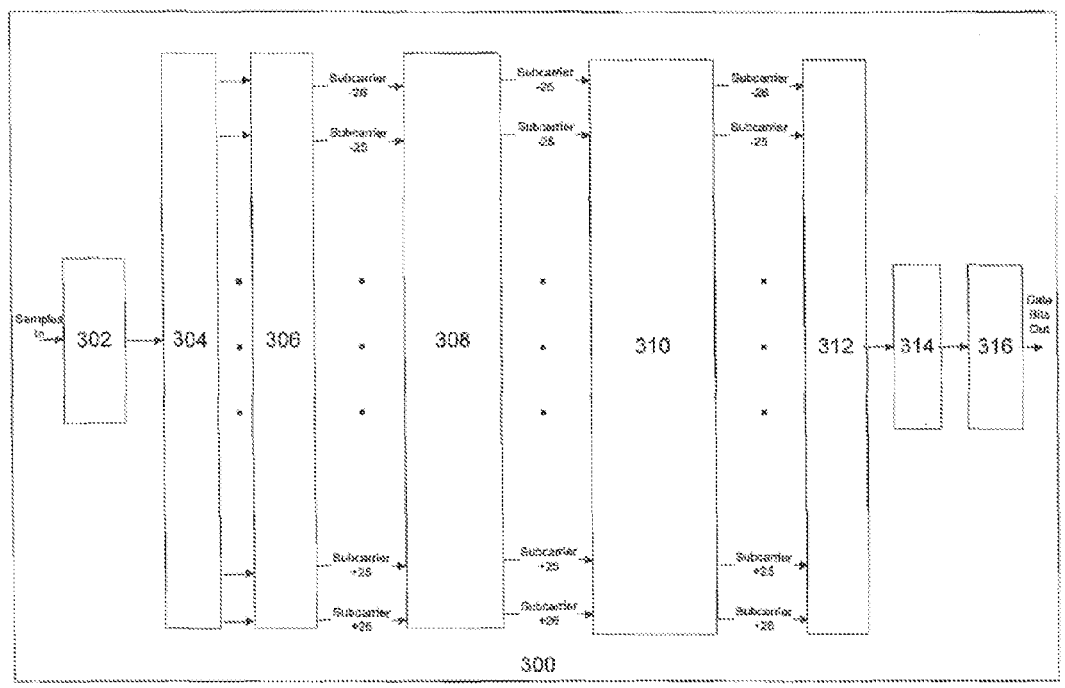
FIG. 3 illustrates a block diagram of a long-range receiver implemented in the inventive system.

FIG. 3 illustrates a block diagram of a long-range receiver 300 used in the present invention. Receiver 300 receives the OFDM sub-carriers and instead of making a decision for each symbol, receiver 300 takes a whole screen of symbols on each of the sub-carriers and runs a correlator on each of the received sub-carriers. Receiver 300 includes cyclic prefix removal module 302, Fast Fourier Transfer (FFT) 304, frequency domain module 306, de-spreader module 308, QAM symbol demapper 310, parallel to serial converter 312, Viterbi decoder 314, and descrambler 316. Cyclic prefix removal module 302 removes the cyclic prefix inserted by transmitter 200. Thereafter, FFT 304 converts the serial time domain signals into frequency signals. Frequency domain module 306 applies a weighting factor on each frequency domain signal. The correlator in de-spreader module 308 despreads the signals that were spread at the transmitter. The invention allows the use of a simple correlator receiver for obtaining maximum detection. The correlator is a matched filter and the path of the filter are the spreading sequence time reversed and complex conjugated. As such, the first element of the sequence becomes the last and the last become the first. In the case of a spreading sequence where L=16, the correlator produces 16 outputs that correspond to the 16 inputs. Thereafter, de-spreader module 308 takes exactly the point of maximum correlation which is exactly the recovered symbol. Processing gain in the inventive system of approximately 10*log 10(L) is achieved by applying the matched filter per subcarrier since the channel decoder processing follows the matched filtering.

Symbol demapper 310 then generates the coded bits from each of the sub-carriers in the OFDM sequence. Parallel to serial converter 312 converts the digital time domain signals into a plurality of serial time domain signals. Viterbi Decoder 314 decodes input symbols to produce binary output symbols. Bits in the data portion are descrambled by descrambler 318.

The present invention thus allows for the use of the same bandwidth that is used in legacy systems employing the 802.11a and 802.11g standards. It may also be possible to get a diversity benefit by mapping each of the L chips in a block to a different sub-carrier. Since the equalization is performed before de-spreading, each received chip may be pulled from a different sub-carrier. Although the noise variance on each chip will be different, the present invention provides a frequency diversity benefit.

Furthermore, the data path computational complexity when L=4 requires no more than one negation operation per transmitted chip beyond processing implemented in 802.11a/802.11g and no more than one negation operation and one addition per received chip beyond processing implemented in 802.11a/802.11g. When L=16 the data path computational complexity requires no more than two negation operations and two additions per transmitted chip beyond processing implemented in 802.11a/802.11g and no more than two negation operations and three additions per received chip beyond processing implemented in 802.11a/802.11g. Thus, no new multipliers are required.

Figure 4:
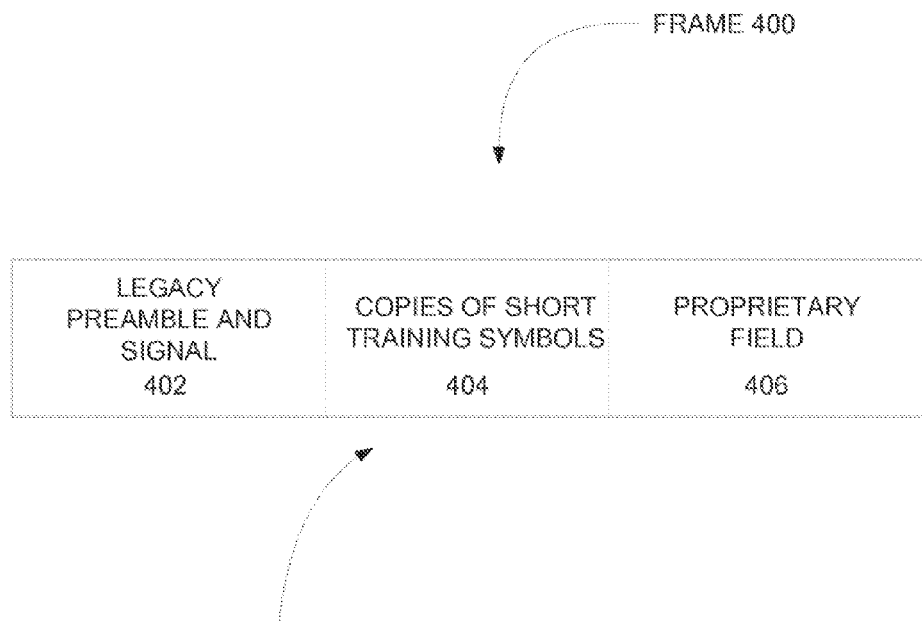
FIG. 4 illustrates a long-range frame 400 utilized in the present invention.

As is known to those skilled in the art, each legacy 802.11a/802.11g system needs to decode a valid SIGNAL field to determine the length of a frame to set its CCA bit. The legacy SIGNAL field specifies the rate and a length value in bytes which matches the length of the actual frame. If additional information is added to the frame, at the end of the frame when the legacy receiver attempts to decode the FCS, it detects an error and discards the frame. FIG. 4 illustrates a long-range frame 400 utilized in the present invention. According to the present invention, after the legacy preamble and SIGNAL frame 402, L copies of short training symbols 404 are appended and followed by a proprietary field 406. The additional copies of short training symbols 404 allow long-range receiver 300 to perform carrier detection in extremely low SNR. Proprietary field 406 includes DSSS-encoded OFDM for long training symbols, SIGNAL and data. The proprietary long training symbols, SIGNAL field and data symbols are transmitted using the inventive DSSS encoding. As such, frame 400 includes information for instructing legacy 802.11a/802.11g receivers to ignore field 406. According to the invention, a legacy system uses the header in preamble 402 to set its CCA bit provided that the actual frame duration does not exceed 5.48 msec. and the transmissions from the inventive system are above a sensitivity threshold. The channel utilization in the current invention is exactly the same as the channel utilization in a legacy 802.11a/802.11g system. Furthermore, there is no need to clock DACs, ADC and logic at lower rates. Additionally, there is no requirement for special BSS as the long-range rates are just new rates that can be used in the same BSS with legacy device. Therefore, compatibility is ensured by prepending the legacy preamble and SIGNAL fields.

It should be appreciated by one skilled in art, that the present invention may be utilized in any device that implements the OFDM encoding scheme. The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A wireless network device capable of use within a wireless network including a legacy wireless device, the wireless network device comprising:
   a symbol mapper configured to generate modulation symbols, and map the modulation symbols to a plurality of subcarriers;
   a spreading module configured to spread the modulation symbols into a number (L) of chips, using a direct sequence spread spectrum technique;
   the wireless network device configured to generate a frame including a proprietary signal portion and a legacy signal portion;
   the proprietary signal portion encoded using the direct sequence spread spectrum technique on a plurality of subcarriers;
   the legacy signal portion is compatible with the legacy wireless device, the legacy signal portion including a legacy preamble instructing the legacy wireless device to set a Clear Channel Assessment (CCA) bit to a value that causes the legacy wireless device to ignore the proprietary signal portion.

2. The wireless network device of claim 1, the legacy preamble further comprising:
   a header including data used by the legacy device to set the Clear Channel Assessment (CCA) bit.

3. The wireless network device of claim 1, the frame further comprising:
   a number of short training symbols appended after the legacy signal portion and before the proprietary signal portion.

4. The wireless network device of claim 3, wherein the number of short training symbols equals the number (L) of chips.

5. The wireless network device of claim 1, the symbol mapper further configured to:
   generate a QAM symbol for each of a plurality of OFDM subcarriers.

6. The wireless network device of claim 5, further comprising:
   a cyclic prefix insertion module configured to prepend a cyclic prefix to each sub-channel.

7. The wireless network device of claim 1, further configured to use a same bandwidth for wireless transmissions used by the legacy wireless device.

8. The wireless network device of claim 1, the proprietary signal portion further comprising: long training symbols, and data encoded using the direct sequence spread spectrum technique in conjunction with orthogonal frequency division multiplexing (OFDM).

9. The wireless network device of claim 1, further configured to:
   map each of the number (L) of chips to a different subcarrier.

10. A wireless network device capable of use within a wireless network including a legacy wireless device, the wireless network device comprising:
    a de-spreader comprising a correlator configured to de-spread symbols on each of a plurality of received subcarriers of a received frame, on a per-subcarrier basis, wherein the subcarriers correspond to a same bandwidth used by the legacy wireless device;
    a symbol demapper configured to generate coded bits from the de-spread symbols for each of the plurality of received subcarriers; a parallel to serial converter configured to convert the coded bits into a sequence of time separated signals
    a decoder configured to decode the sequence of time domain signals to produce binary output signals; and
    a descrambler configured to descramble the binary output signals, the received frame including a proprietary signal portion and a legacy signal portion; the proprietary signal portion is encoded using a direct sequence spread spectrum technique in a plurality of subcarriers; the legacy signal portion is compatible with the legacy wireless device, the legacy signal portion including a legacy preamble instructing the legacy wireless device to set a Clear Channel Assessment (CCA) bit to a value that causes the legacy wireless device to ignore the proprietary signal portion.

11. The wireless network device of claim 10, wherein the correlator comprises:
    a matched filter that produces a number (L) of outputs equaling a spreading length (L) of an incoming sequence.

12. The wireless network device of claim 11, wherein the matched filter implements a time-reversed complex conjugate of a spreading sequence previously used to spread the symbols at a transmitting device, wherein a first element of a sequence becomes a last element, and the last element becomes the first.

13. The wireless network device of claim 10, further configured to use a number of copies of short training symbols appended to the legacy signal portion to perform carrier detection.

14. The wireless network device of claim 13, wherein the number of copies of short training signals equals a spreading length (L).

15. A wireless communication network comprising:
    a legacy wireless receiver configured to set a Clear Channel Assessment (CCA) bit based on information included in a legacy preamble;
    a non-legacy wireless transmitter comprising a spreading module, the non-legacy wireless transmitter configured to generate a frame including a proprietary signal portion and a legacy signal portion; the proprietary signal portion is encoded using a direct sequence spread spectrum technique on a plurality of subcarriers
       the legacy signal portion is compatible with the legacy wireless receiver, the legacy signal portion including the legacy preamble, the legacy preamble instructing the legacy wireless receiver to set the CCA bit to a value that causes the legacy wireless receiver to ignore the proprietary signal portion;
    a non-legacy wireless receiver comprising:
       a correlator configured to de-spread symbols on each of the plurality of encoded subcarriers on a per-subcarrier basis; and
       a descrambler configured to descramble the proprietary signal portion of the frame.

16. The communication network of claim 15, the frame further comprising:
    a number of short training signals appended after the legacy signal portion and before the proprietary signal portion, wherein the number of short training signals equals a number (L) of chips.

17. The communication network of claim 15, the non-legacy wireless transmitter further comprising:
  a symbol mapper configured to generate a QAM symbol for each of a plurality of OFDM subcarriers.

18. The communication network of claim 15, wherein the correlator comprises:
  a matched filter that produces a number (L) of outputs equaling a spreading length (L) of an incoming sequence.

19. The communication network of claim 18, wherein the matched filter implements a time-reversed complex conjugate of a spreading sequence used by the non-legacy wireless transmitter, wherein a first element of a sequence becomes a last element, and the last element becomes the first.

20. The communication network of claim 17, the non-legacy wireless transmitter further comprising:
  the spreading module further configured to spread the modulation symbols into a number (L) of chips; and
  a mapping module configured to map each of the number (L) of chips to a different subcarrier.

\* \* \* \* \*